(No Model.)
L. C. BEEBE.
GAS GENERATOR.
No. 298,057. Patented May 6, 1884.
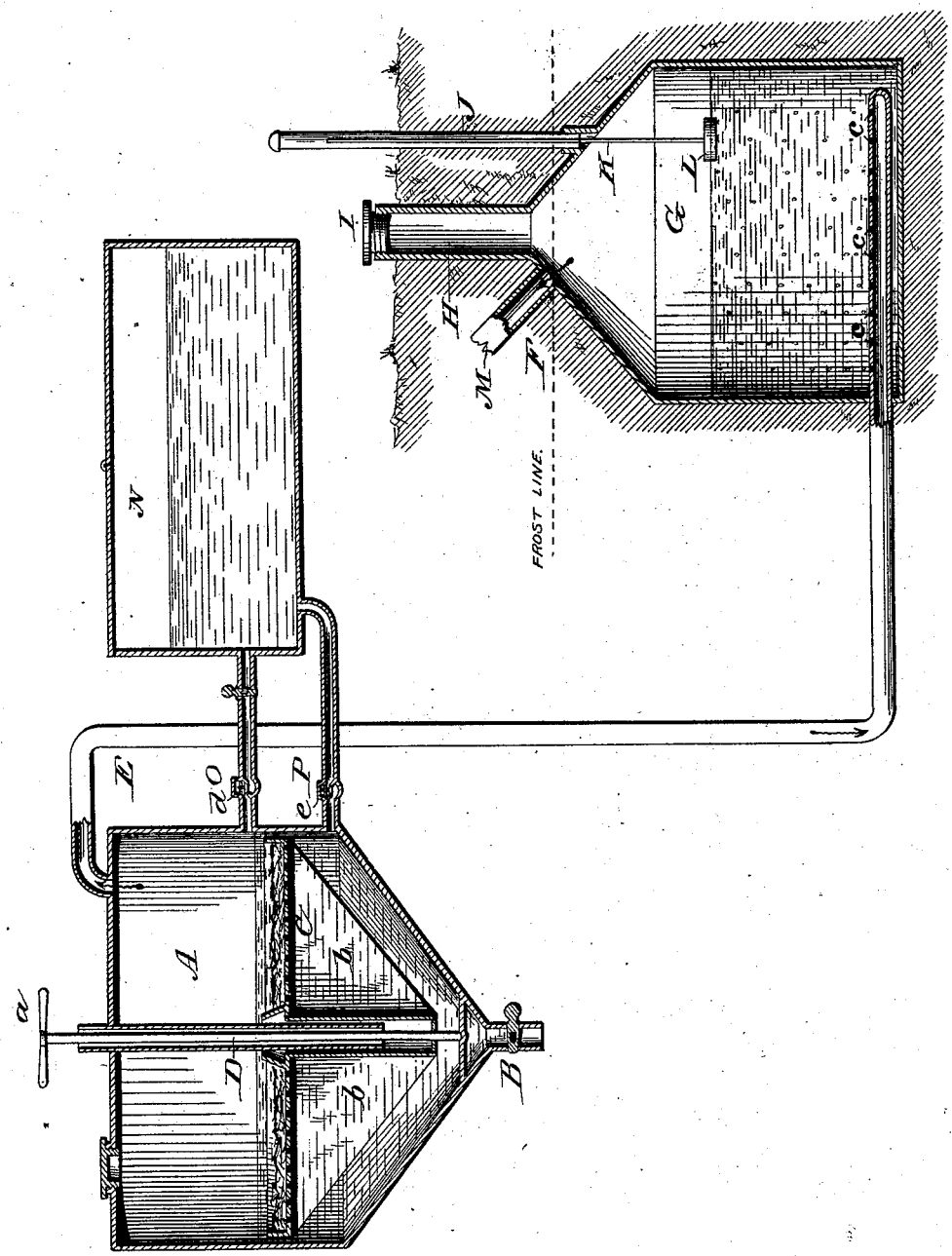
WITNESSES:
Jas. F. DuHamel.
Walter S. Dodge.
INVENTOR:
Lyman C. Beebe,
by Dodge & Son,
attys.

United States Patent Office.

LYMAN C. BEEBE, OF VILLISCA, ASSIGNOR OF ONE-HALF TO ROBERT TRUMAN, OF AFTON, IOWA.

GAS-GENERATOR.

SPECIFICATION forming part of Letters Patent No. 298,057, dated May 6, 1884.

Application filed October 11, 1883. (No model.)

*To all whom it may concern:*

Be it known that I, LYMAN C. BEEBE, of Villisca, in the county of Montgomery and State of Iowa, have invented certain Improvements in Gas-Generators, of which the following is a specification.

This invention consists in a novel construction of apparatus for producing carbureted hydrogen, and is designed to afford a perfectly safe apparatus for that purpose, which shall be free from the danger of freezing and becoming thereby inoperative, which results I attain by placing the carbureting-chamber apart from the generator proper, and in the ground below the frost-line.

In the drawing annexed hereto is represented a vertical sectional view of my improved apparatus, which, in its general construction and mode of operation, is essentially the same as another for which I have made separate application of even date herewith, the main feature of difference consisting in removing the gasoline-tank from the interior of the generator and placing it underground at a proper depth to prevent freezing.

A represents a vessel, preferably of cylindrical form, and having a bottom in the form of an inverted cone, at the center of which is placed an outlet-cock, B, to permit sediment and dross to be drawn off. This vessel is designed to contain acidulated water, as usual in this class of generators, and contains, also, a basket or holder, C, of perforated sheet metal or other suitable material to hold a supply of iron or zinc scraps or other matter, which, acted upon by acidulated water, will give off hydrogen gas. This basket is carried by a vertical stem or spindle, D, which extends upward through and above the top of chamber or vessel A, and is there furnished with a cross-piece or handle, *a*, by which it may be conveniently rotated. Beneath the basket C are wings or blades *b*, which serve both as braces to support the basket and as agitators to stir up the acidulated water, and prevent the settlement of the acid at the bottom of the vessel A below the basket containing the scrap.

E is an outlet-pipe, through which the gas passes from the generator to a carburetor, F, which consists of a strong vessel or tank, G, of proper size to contain a large supply of gasoline—say a barrel, more or less—the body of which vessel is to be placed underground, and below the frost-line. From the top of tank or vessel G rises a neck or pipe, H, provided at the top with a screw-cap or removable cover, I, which may be removed whenever it is found necessary to replenish the supply of gasoline, the pipe or neck being extended upward sufficiently to reach the surface of the ground or to project above the same, if preferred. By the side of the pipe or neck H is arranged a glass tube, J, which may be graduated or not, as desired, and which contains a rod or stem, K, carried by a float, L, at its lower end, said rod serving to indicate the height of gasoline in tank G. The pipe E from the generator enters the tank G at or near the bottom, and extends from one side across to or nearly to the other, the portion within the tank being provided with numerous perforations, *c*, through which the gas escapes in numerous fine jets or streams, passing thence up through the gasoline and becoming strongly charged therewith, so as to form a fine illuminating-gas, which passes from tank G by a main or supply pipe, M, to the point or points of consumption.

In order to render the apparatus automatic in its action, I provide a reservoir or supply-tank, N, to contain acidulated water, said tank communicating with the interior of vessel A by pipes O P, the former entering above and the latter below the basket C. Pipe O is furnished with a check-valve, *d*, opening inward toward the vessel A, and pipe P is provided with an outwardly-opening check-valve, *e*. When the supply or generation of gas exceeds the demand, the pressure within vessel A causes the closing of check-valve *d* and forces the acidulated water through pipe P back into tank N, causing its level within tank A to fall below the basket C, and consequently stopping the generation of gas. When the supply is reduced and the pressure accordingly decreased, the water re-enters through pipe O, and, rising above the level of basket C, renews the action of the apparatus.

Although I prefer that the pipe from the generator should enter at or near the bottom, this is not essential, because the gasoline is of so volatile a nature that the space above the liquid will be filled with gasoline vapor or gas, which would sufficiently enrich the hydrogen; or the latter may pass downward through a pipe into the gasoline, and then rise through it.

I am aware that it is not new to place a carbureter underground to avoid danger in case of explosion, and that a generator similar in principle to the one herein described has been connected with a carburetor by a pipe extending from the top of the generator into the carburetor. I do not broadly claim either of these features; but, believing myself to be the first to thus place the carburetor below the frost-line and to connect the generator with a carburetor thus buried,

What I claim is—

A gas-generating apparatus consisting of a vessel, A, charged with acidulated water, a perforated basket, C, within said vessel, containing iron scraps or equivalent matter, acidulated-water reservoir N, pipes O P, connecting said reservoir with vessel A, and provided, respectively, with inwardly-opening check-valve $d$ and outwardly-opening check-valve $e$, a gasoline-tank, G, outside of vessel A and below the frost-line, and a pipe extending from generator A to tank G, entering the latter near its bottom, and perforated within said tank, all substantially as described and shown.

LYMAN C. BEEBE.

Witnesses:
W. L. ERES,
E. C. GIBBS.